US008798066B2

(12) United States Patent
Assarpour

(10) Patent No.: US 8,798,066 B2
(45) Date of Patent: Aug. 5, 2014

(54) METHOD FOR IPV6 LONGEST PREFIX MATCH

(71) Applicant: Avaya, Inc., Basking Ridge, NJ (US)

(72) Inventor: Hamid Assarpour, Arlington, MA (US)

(73) Assignee: Avaya Inc., Basking Ridge, NJ (US)

( * ) Notice: Subject to any disclaimer, the term of this patent is extended or adjusted under 35 U.S.C. 154(b) by 121 days.

(21) Appl. No.: 13/628,068

(22) Filed: Sep. 27, 2012

(65) Prior Publication Data

US 2014/0086249 A1 Mar. 27, 2014

(51) Int. Cl.
*H04L 12/56* (2006.01)
(52) U.S. Cl.
CPC ........... *H04L 45/7457* (2013.01); *H04L 45/748* (2013.01)
USPC .......................................... 370/392; 370/389
(58) Field of Classification Search
USPC ................................. 370/389–427
See application file for complete search history.

(56) References Cited

U.S. PATENT DOCUMENTS

2011/0292943 A1* 12/2011 Du et al. ....................... 370/392

OTHER PUBLICATIONS

Kim et al., An Efficient IP Lookup Architecture with Fast Update Using Single-Match TCAMs, 2008, WWIC 2008, LNCS 5031, p. 104-114.*

* cited by examiner

*Primary Examiner* — Hoon J Chung
(74) *Attorney, Agent, or Firm* — Anderson Gorecki & Rouille LLP

(57) ABSTRACT

IPv6 longest prefix match lookups are implemented by splitting disjoint forwarding rules from non-disjoint forwarding rules and storing these forwarding rules in separate TCAMs. When an IPv6 address is received, the full IP address is passed to the TCAM containing the disjoint forwarding rules and the first n bits of the IP address are passed to the TCAM containing the non-disjoint forwarding rules. If a hit is received in the TCAM containing the disjoint forwarding rules, a result of the hit is used to implement a forwarding decision and the search in the TCAM containing the non-disjoint forwarding rules is terminated. If no hit is obtained from the disjoint TCAM, the search result of the non-disjoint TCAM is used. If a continue flag is set in the result received from the disjoint TCAM, a sub-trie based lookup is implemented based on the remaining m bits of the IPv6 address.

18 Claims, 2 Drawing Sheets

METHOD FOR IPV6 LONGEST PREFIX MATCH

CROSS-REFERENCE TO RELATED APPLICATIONS

None.

BACKGROUND

1. Field

This application relates to network elements and, more particularly, to a method for performing IPv6 longest prefix match lookup.

2. Description of the Related Art

Data communication networks may include various switches, nodes, routers, and other devices coupled to and configured to pass data to one another. These devices will be referred to herein as "network elements". Data is communicated through the data communication network by passing protocol data units, such as frames, packets, cells, or segments, between the network elements by utilizing one or more communication links. A particular protocol data unit may be handled by multiple network elements and cross multiple communication links as it travels between its source and its destination over the network.

Network elements are designed to handle packets of data efficiently, to minimize the amount of delay associated with transmission of the data on the network. Conventionally, this is implemented by using hardware in a data plane of the network element to forward packets of data, while using software in a control plane of the network element to configure the network element to cooperate with other network elements on the network. For example, a network element may include a routing process, which runs in the control plane, that enables the network element to have a synchronized view of the network topology so that the network element is able to forward packets of data across the network toward its intended destination. Multiple processes may be running in the control plane to enable the network element to interact with other network elements on the network and forward data packets on the network.

The applications running in the control plane make decisions about how particular types of traffic should be handled by the network element to allow packets of data to be properly forwarded on the network. As these decisions are made, the control plane programs the hardware in the dataplane to enable the dataplane to be adjusted to properly handle traffic as it is received. The data plane includes ASICs, FPGAs, and other hardware elements designed to receive packets of data, perform lookup operations on specified fields of packet headers, and make forwarding decisions as to how the packet should be transmitted on the network. Lookup operations are typically implemented using tables and registers containing entries populated by the control plane.

One way to address packets of data to enable the packets to be correctly routed through the network is to add an Internet Protocol (IP) header containing an IP address to the packet. When a router receives a packet, it will perform a search in a forwarding table to determine which forwarding rule is to be applied to a packet having the IP address contained in the packet. Since forwarding rules may apply to ranges of IP addresses, not all of the bits of the IP address may be relevant when making a forwarding decision. For example, a given range of IP addresses may be commonly located within a particular sub-network area, such that all traffic addressed to an IP address within the range of IP addresses should be commonly forwarded by a router toward the subnet. In this situation, the less significant bits of the IP address are not relevant to the forwarding decision and, hence, the router may make a forwarding decision by looking only at the more significant bits of the IP address.

An IP address may therefore be viewed as having an address and a prefix length, e.g. address/16 would indicate that the prefix is 16 bits long such that only the 16 most significant bits of the address have forwarding significance. The prefix thus specifies a range of IP addresses since all IP addresses with the same prefix will be forwarded according to the forwarding rule associated with the prefix. For example, a /16 bit prefix would represent a range of 64K IP addresses.

Since it is possible to have sub-ranges associated with different forwarding operations, a router will commonly implement a forwarding decision by looking for the longest prefix of the IP address which matches a routing entry in the forwarding table. This allows more specific routing information to take precedence over more general routing information. For example, a router may have information that packets matching a particular /16 prefix should be forwarded toward a particular destination, but that a sub-range matching a particular /24 prefix should be forwarded to a different destination. Accordingly, when a router receives a packet, it performs a lookup operation to determine the longest prefix in its forwarding tables that matches the IP address contained in the packet. A lookup of this nature is referred to as Longest Prefix Match (LPM).

There are two common methods to implement hardware-based LPM lookup. The first method uses the Ternary Content Addressable Memory (TCAM). A TCAM is a fully-associative memory that can store 0, 1 and don't care bits. In a single clock cycle, a TCAM will find all addresses where information is stored matching the input value. To use a TCAM to implement a longest prefix match, an IP address is input to the TCAM and all prefixes matching the IP address are located. The longest prefix is thus selected. Using TCAM is very fast, since it is able to search all stored prefixes in parallel. However, TCAM consumes a lot of power as compared to other forms of memory, exhibits poor scalability, and is more expensive than other memory technologies.

The second method of implementing an LPM search is based on a multi-bit trie representation of the prefix table. In a multibit trie, one or more bits of a value to be found are scanned in a fixed or variable strides to direct the branching of the children. The issue with this method is its lookup latency since all memory accesses to traverse the tree are sequential. Although latency may be reduced by using higher cost Synchronous Random Access Memory, latency gets worse when lower cost DDR2/3/4 SDRAM memory is used.

There are two versions of the IP protocol, IPv4 and IPv6. IPv4 addresses have 32 bits, which causes many routes to be crowded together such that unused IP addresses may be scarce. Existing Longest Prefix Match algorithms were designed to optimize performance for the 32 bit address space specified by IPv4. IPv6 addresses, by contrast, have 128 bits which enables many more addresses to be available on the network. Unfortunately, using IPv4 algorithms (e.g. pure trie-based or existing TCAM based lookup processes) do not scale well when ported to the 128 bit address space specified by IPv6. Accordingly, it would be advantageous to find a solution for IPv6 which is effective at implementing a longest prefix match search while also exhibiting low latency, at low cost, and which is scalable.

SUMMARY OF THE DISCLOSURE

The following Summary, and the Abstract set forth at the end of this application, are provided herein to introduce some concepts discussed in the Detailed Description below. The Summary and Abstract sections are not comprehensive and are not intended to delineate the scope of protectable subject matter which is set forth by the claims presented below.

An optimal combination of TCAM is used to implement fast lookup for IPv6 prefix matching, by splitting disjoint forwarding rules from non-disjoint forwarding rules. Disjoint forwarding rules are implemented in a separate TCAM in an un-ordered manner, to facilitate entry of new rules and deletion of rules while minimizing TCAM churn. Non-disjoint rules are implemented using a separate TCAM. When an IPv6 address is received, the full IP address is passed to the TCAM containing the disjoint forwarding rules and the first n bits of the IP address are passed to the TCAM containing the non-disjoint forwarding rules. If a hit is received in the TCAM containing the disjoint forwarding rules, a result of the hit is used to implement a forwarding decision and the search in the TCAM containing the non-disjoint forwarding rules is terminated. If no hit is obtained from the disjoint TCAM, the search result of the non-disjoint TCAM is used. If a continue flag is set in the result received from the disjoint TCAM, a sub-trie based lookup is implemented based on the remaining m bits of the IPv6 address.

BRIEF DESCRIPTION OF THE DRAWINGS

Aspects of the present invention are pointed out with particularity in the claims. The following drawings disclose one or more embodiments for purposes of illustration only and are not intended to limit the scope of the invention. In the following drawings, like references indicate similar elements. For purposes of clarity, not every element may be labeled in every figure. In the figures:

DETAILED DESCRIPTION

Figure 1:
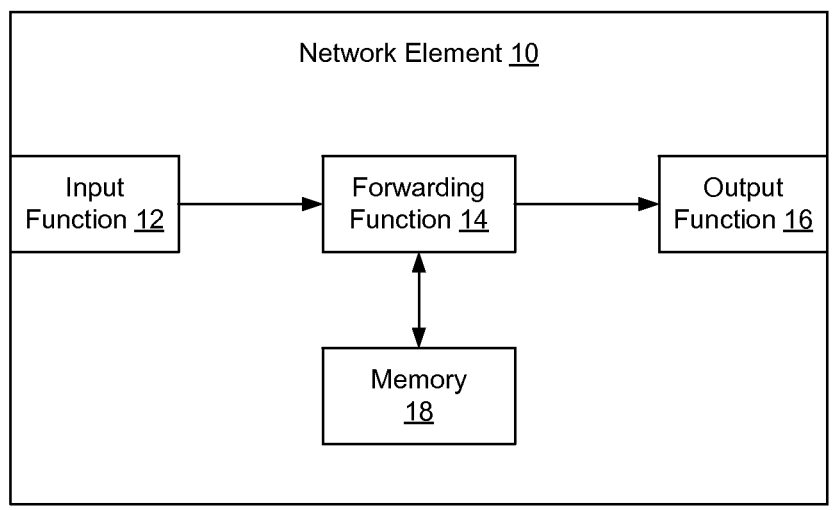
FIG. 1 is a functional block diagram of an example network element.

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

IPv6 uses 128 bit addresses. Although it is possible to have overlapping (non-disjoint) sets of forwarding rules, the extremely large nature of the address space makes it much more likely that forwarding rules will be sparsely populated and, thus, disjoint. To take advantage of this characteristic, according to an embodiment, an optimal combination of TCAM is used to implement fast lookup for IPv6 prefix matching, by splitting disjoint forwarding rules from non-disjoint forwarding rules. Specifically, non-disjoint forwarding rules and disjoint forwarding rules are stored in separate TCAMs, and search operations are implemented in parallel in these two TCAMs.

In one embodiment, the disjoint forwarding rules are implemented in a first TCAM in an un-ordered manner, which facilitates entry of new rules and deletion of rules while minimizing TCAM churn. Since the disjoint forwarding rules by definition do not overlap, an IP address will match at most one disjoint forwarding rule and, accordingly, it is not necessary to have the disjoint forwarding rules inserted in any particular order into the TCAM. Non-disjoint rules are implemented using a separate TCAM and, unlike the disjoint rules, are inserted into the TCAM in an ordered manner to keep track of the overlapping nature of the forwarding rules.

When an IPv6 address is received, the full IP address is passed to the TCAM containing the disjoint forwarding rules. At the same time, the first n bits of the IP address are passed to the TCAM containing the non-disjoint forwarding rules. The first n bits are used to look for the forwarding rules based on the first n bits. If the result from the non-disjoint TCAM indicates that a subsequent search should be performed using the remaining bits of the IP address (a continue flag is set in the result received from the disjoint TCAM), a sub-trie based lookup is implemented based on the remaining m bits of the IPv6 address.

In this scheme, the first n bits of non-disjoint IPv6 prefixes are stored in a TCAM_A. Placement algorithms for non-disjoint Longest Prefix Match (LPM) addresses are well known. Each TCAM entry has a one-to-one corresponding entry in a separate memory called TCAM Result Memory. If the prefix length is less than or equal n bits, then the corresponding Result Entry is configured with the Continue Flag set to zero (False) and a valid NextHop Table Address. If the prefix length is greater than n bits, then the corresponding Result Entry is configured with the Continue Flag set to one (True) and a valid pointer to the root of a sub-trie tree. Then the rest of the prefix (prefix length—n) is inserted into the selected sub trie tree. The trie tree insertion algorithms are also well known. The remaining m bits of the IP address are used to implement a sub-trie tree lookup to determine the longest prefix match within the sub-trie tree.

If a hit is received in the TCAM containing the disjoint forwarding rules, a result of the hit is used to implement a forwarding decision and the search in the TCAM containing the non-disjoint forwarding rules is terminated. If no hit is obtained from the disjoint TCAM, the search result of the non-disjoint TCAM is used.

A second TCAM block (TCAM_B) is used to store only the disjoint prefixes. Since this disjoint prefixes do not include overlapping forwarding rules, the forwarding rules are entirely decoupled from each other and TCAM_B is not required to be sorted to implement updating. Thus, entries may be added and deleted from this block without affecting other entries in the TCAM. This speeds implementation of new rules while minimizing TCAM churn.

During search operation, the full 128-bit IPv6 address is used to lookup in the TCAM_B (disjoint prefixes), and only the first n-bits of the address is used to lookup in the TCAM_A (non-disjoint prefixes). Both lookups are performed simultaneously. A hit in TCAM_B terminates the search and the corresponding entry in the TCAM Result Memory provides the NextHop Table Address. If TCAM_B is missed, then TCAM_A is always hit since its last entry is programmed with don't cares to provide a default forwarding instruction. If the Continue Flag in the corresponding entry in the Result Memory is zero (False), then the search is terminated and the entry's pointer is a valid NextHop Table Address. If the continue flag in the corresponding entry in the result memory is one (true), the entry's pointer is a valid pointer to the root of a sub trie tree where the search continues and the rest of the IPv6 address bits (m bits) are used to search this sub tree.

The use of TCAM to implement forwarding lookups for prefix lengths of up to n bits (which for example n can be set to /64 or /80) allows a single memory access operation to lookup large portion of the IPv6 address. Since the upper addresses typically represent network addresses and provide more address aggregation, it reduces the number of required entries in the TCAM. The lower parts of the address space typically gets sparse, so lookup operations in these ranges of IP address is well is suited for Trie based algorithms utilizing regular memory technologies such as SRAMs, RLDRMs and DDR SDRAMs. Also, the trie based search is then limited to only m bits rather than the full 128 bits of the address, which minimizes the depth of the tree and, hence, the latency associated with implementing the full IPv6 lookup.

FIG. 1 is a functional block diagram of an example network element. As shown in FIG. 1, in its simplest form, a network element includes an input function 12 to receive packets of data from a communication network, a forwarding function 14 to make forwarding decisions, and an output function 16 to forward the packet onward onto the communication network. The forwarding function, in one embodiment, is designed to perform Internet Protocol Version 6 (IPv6) lookup operations in memory 18. Memory 18 contains forwarding rules, and forwarding function 14 uses the forwarding rules to allow the forwarding rule matching the longest prefix of an IPv6 address associated with the packet to be used in connection with implementing a forwarding decision for the packet.

Figure 2:
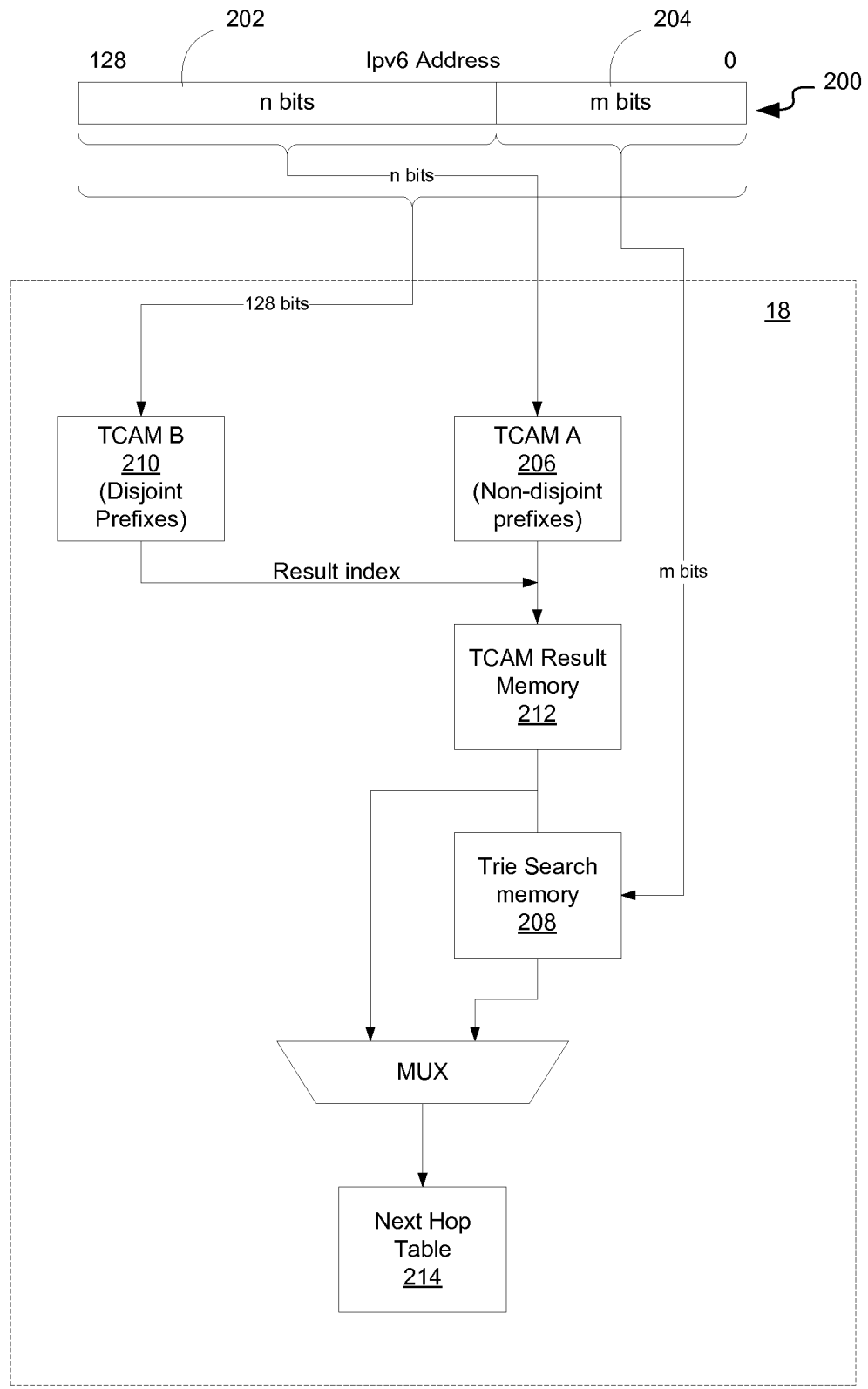
FIG. 2 is a functional block diagram of an example memory for use in implementing an IPv6 lookup operation in a network element such as the example network element of FIG. 1.

FIG. 2 shows an example of the memory 18 in greater detail, and also illustrates how the memory uses fields of the IP address of a packet to perform a longest prefix match operation according to an embodiment. As shown in FIG. 2, the 128 bit IPv6 address 200 is broken into two regions 202, 204 containing n bits and m bits respectively, where n+m=128. The more significant n bits are used to implement an initial longest prefix match in TCAM A 206 containing entries associated with non-disjoint prefix forwarding rules, and the less significant m bits are then used, if necessary, to perform a secondary trie-based longest prefix match in memory 208. The entire 128 bits of IPv6 address 200 are also used to perform a longest prefix match in TCAM B 210 containing entries associated with disjoint prefix forwarding rules. The result of lookup is a pointer to TCAM result memory 212 which provides a pointer to next hop table 214

According to an embodiment, forwarding rules are separated according to whether they are disjoint or non-disjoint. TCAM A 206 is used to store non-disjoint forwarding rules and TCAM B 210 is used to store disjoint forwarding rules.

Forwarding rules are often associated with ranges of IP addresses. For example, a forwarding rule associated with a /16 prefix would mean that any IP address containing the specified 16 most significant bits should be forwarded according to the forwarding rule. Thus, for example, a forwarding rule may specify that any IP address matching prefix [0000 0010 0011 1100] should be forwarded toward next hop router #22. The TCAM would implement this by setting [0000 0010 0011 1100 XXXX . . . ] to point toward a memory location in TCAM result memory 212 associated with next hop router #22.

It is possible for two or more forwarding rules to commonly apply to the same IP address. Forwarding rules of this nature are referred to herein as being non-disjoint. Specifically, as used herein, the term "non-disjoint forwarding rules" will be defined as referring to a set of two or more forwarding rules which have at least partial overlap, such that the two forwarding rules both apply to at least one IP address. Non-disjoint prefixes are defined herein as prefixes which at least partially overlap such that a given set of non-disjoint prefixes both may be used to identify at least one IP address. For example, a /18 forwarding rule related to prefix [0000 0010 0011 1100 10] would refer to a subset of the entries associated with the /16 prefix [0000 0010 0011 1100], and would be implemented by causing entry [0000 0010 0011 1100 10XX . . . ] to point to a different TCAM result memory entry.

Disjoint prefixes, and disjoint forwarding rules, by contrast, are prefixes or forwarding rules that specify distinct ranges of IP addresses that have no overlap. A prefix is disjoint if it specifies a unique range of IP addresses that is not overlapped by any other prefix associated with a forwarding rule to be implemented by the forwarding function.

Disjoint prefixes, by definition, thus are associated with different ranges of IP addresses that do not overlap. Accordingly, each prefix of a set of disjoint prefixes may be independently entered into a prefix search table without affecting any other entries of the prefix search table. Likewise, each prefix of a set of disjoint prefixes may be independently removed from a prefix search table without affecting any other entries of the prefix search table. Because the address space available in the IPv6 forwarding space is extremely large, it may be expected that a large majority of IPv6 prefixes will be disjoint.

Because non-disjoint prefixes by definition at least partially overlap, non-disjoint prefixes may not be entered or removed from a prefix search table without affecting at least a subset of other entries of the prefix search table.

As shown in FIG. 2, according to an embodiment, two Trinary Content Addressable Memories (TCAMs) are used to implement prefix search tables. A first TCAM (TCAM A 206) is used to store non-disjoint prefixes, and a second TCAM (TCAM B 210) is used to store disjoint prefixes. Prefixes in the second TCAM (TCAM B 210) are all disjoint. Accordingly, in one embodiment, these prefixes are not ordered but simply are added to the TCAM and removed from the TCAM as necessary by the network element. As new prefix forwarding rules are to be added, they simply are added to the end of the TCAM and as prefix forwarding rules are to be removed, the TCAM is searched to identify the prefix forwarding rule and the TCAM is then updated by removing the prefix forwarding rule. Since the TCAM forwarding rules are disjoint, no updating to entries associated with other prefix forwarding rules is required to implement or remove prefix forwarding rules from the TCAM storing the disjoint forwarding rules.

TCAM A, by contrast, stores non-disjoint prefix forwarding rules. To limit the number of entries in TCAM A, the depth of the TCAM is limited to n bits such that only prefix forwarding rules having a prefix of /n and less are implemented in TCAM A. This limits the size of TCAM A to contain $2^n$ entries to constrain the cost associated with TCAM A. Likewise, by limiting the size of TCAM A it is possible to minimize the power drawn by TCAM to thus increase the operating efficiency of network element 12. The prefix forwarding rules stored in TCAM A are ordered according to affected IP address to enable the non-disjoint prefix rules to be organized in a logical manner.

To enable forwarding rules having prefixes longer than n bits to be implemented, according to an embodiment if a non-disjoint entry's prefix length is shorter than n bits, it is implemented wholly within the non-disjoint TCAM A. The result of the TCAM A search will point to an entry in the TCAM result memory 212 which, in this instance, includes a continue flag with a zero value indicating that no further search is required, and a valid next hop table address. However, where a non-disjoint entry's prefix length is longer than n bits, the result of the TCAM search will point to an entry in the TCAM result memory 212 in which the continue flag is set to one. Further, in this instance, the entry in the TCAM result memory 212 will not include a valid next hop table address but rather will be set to point to a root of a sub-trie tree implemented in memory 208.

If the continue flag is set, the pointer to the root of the sub-trie tree is used to access the sub-trie tree, and the remaining m bits of the IP address (m=128−n) is used to access the forwarding rule associated with the prefix rule having a prefix length of longer than In bits. The m bits of the IP address are then used to search the sub-trie tree for a match, which will contain a valid next hop table address for the IPv6 LPM Search.

To implement an IP lookup, the entire 128 bit IPv6 address is also passed to TCAM B 210 storing disjoint prefix forwarding rules. If a match is found in the TCAM storing disjoint prefix forwarding rules, the result index from the positive search is passed to the TCAM result memory. The index is used to obtain a next hop table address from the TCAM result memory which is then used to obtain the forwarding action from the next hop table. If a result from the TCAM storing disjoint prefix forwarding rules is found, that result is used and the search in TCAM A storing non-disjoint prefix forwarding rules is terminated.

If no match is found in the TCAM storing disjoint prefix forwarding rules, a result is guaranteed to be found in the TCAM storing non-disjoint prefix forwarding rules because of the use of wildcards. Specifically, the TCAM last index is set to all don't care, i.e. is a catch-all entry. Its corresponding entry in the result memory is configured with the continue flag set to one (true) and a valid pointer to the root of a sub-trie tree. Other default forwarding state may also be specified without requiring a lookup in the sub-trie tree, e.g. by specifying a default forward entry in the next hop table 14.

The TCAM storing non-disjoint rules will return a matching entry for the IP address. If an entry's prefix length is less than or equal to n bits, then its corresponding Result Entry is configured with the Continue Flag set to zero (false) indicating that no further search is required and the Result Entry will also include a valid next hop table address.

If the entry's prefix length is greater than n bits, then its corresponding Result Entry in the TCAM result memory 212 is configured with the Continue Flag set to one (true) indicating that a further search is required, and the Result Entry in the TCAM result memory 212 will also include a pointer to the root of a sub-trie tree.

The pointer, in one embodiment, may be implemented as a result index value having r bits. The trie search memory, in this embodiment, includes $2^r$ sub-tries, each corresponding to a TCAM result memory. The r bits identify which of the sub-tries should be searched, and the m least significant bits of the IPv6 address are fed into the sub-trie identified by the result index to obtain a next hop table address for the IP address. The number of sub-tries used to hold prefix rules exceeding n bits in length may be adjusted dynamically depending on the number of such prefix rules to maintain the depth of the trees to a reasonable level, thus minimizing latency associated with implementing the secondary sub-trie search.

The functions described herein may be embodied as a software program implemented in control logic on a processor on the network element or may be configured as a FPGA or other processing unit on the network element. The control logic in this embodiment may be implemented as a set of program instructions that are stored in a computer readable memory within the network element and executed on a microprocessor on the network element. However, in this embodiment as with the previous embodiments, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible non-transitory computer-readable medium such as a random access memory, cache memory, read-only memory chip, a computer memory, a disk, or other storage medium. All such embodiments are intended to fall within the scope of the present invention.

It should be understood that various changes and modifications of the embodiments shown in the drawings and described herein may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method for IPv6 Longest Prefix Match, the method comprising the steps of:
receiving, by a network element, a packet including an IPv6 address, the IPv6 address having 128 bits;
passing all 128 bits of the IPv6 address to a first Ternary Content Addressable Memory (TCAM), the first TCAM storing forwarding entries associated with disjoint prefix forwarding rules;
passing a first subset of the bits of the IPv6 address to a second TCAM, the second TCAM storing forwarding entries associated with non-disjoint prefix forwarding rules, the first subset of the bits of the IPv6 address including fewer than all 128 bits of the IPv6 address;
performing a lookup operation in the first TCAM and the second TCAM in parallel.

2. The method of claim 1, further comprising the step of using a first result of the lookup operation from the first TCAM and stopping the lookup operation in the second TCAM if the first result from the lookup operation from the first TCAM is positive.

3. The method of claim 2, wherein when the first result is positive, the first result contains a pointer to a next hop forwarding table.

4. The method of claim 2, further comprising the step of using a second result of the lookup operation from the second TCAM if the first result of the lookup operation from the first TCAM is not positive.

5. The method of claim 4, wherein the second TCAM includes an entry with all wildcard entries to guarantee a match for the IP address in the second TCAM.

6. The method of claim 4, wherein when the second result is positive, the second result contains a pointer to a next hop forwarding table.

7. The method of claim 4, wherein when the second result is positive, the second result contains a continue flag and a pointer to a root of a sub-trie tree to be used to perform a third lookup operation.

8. The method of claim 7, further comprising the step of performing a third lookup in the sub-trie tree identified by the pointer using a second subset of the bits of the IPv6 address.

9. The method of claim 1, wherein the disjoint prefix forwarding rules are a set of forwarding rules in which no two forwarding rules of the set commonly apply to any individual IPv6 address.

10. The method of claim 1, wherein the non-disjoint prefix forwarding rules are a set of forwarding rules in which subsets of two forwarding rules commonly apply to IPv6 addresses.

11. The method of claim 1, wherein the forwarding entries associated with disjoint prefix forwarding rules are not ordered in the first TCAM.

12. A network element for IPv6 Longest Prefix Match, comprising:
an input function, a forwarding function, a memory, and an output function, the forwarding function interacting with the memory to make forwarding decisions in connection with receipt of packets on the input function and forwarding of the packets on the output function;
wherein the memory comprises:
a first Ternary Content Addressable Memory (TCAM) configured to store forwarding entries associated with disjoint prefix forwarding rules and to perform a search on the forwarding entries using all 128 bits of an IPv6 address of a packet;
a second TCAM configured to store forwarding entries associated with non-disjoint prefix forwarding rules and to perform a search on the forwarding entries using a first subset of the bits of the IPv6 address, the first subset of the bits of the IPv6 address including the most significant bits of the IPv6 address and fewer than all 128 bits of the IPv6 address;
wherein the memory is configured to perform an IP search in the first TCAM and second TCAM in parallel.

13. The network element of claim 12, wherein the memory is configured to terminate the search in the second TCAM if the search in the first TCAM returns a positive result.

14. The network element of claim 13, wherein the positive result is a pointer to an entry in a next hop forwarding table.

15. The network element of claim 12, wherein a positive result from the second TCAM includes a value and a continue flag.

16. The network element of claim 15, wherein when the continue flag is set, the value is a pointer to a root of a sub-trie tree.

17. The network element of claim 16, wherein the sub-trie tree is maintained in a form of random access memory not implemented as a TCAM.

18. The network element of claim 15, wherein when the continue flag is not set, the value is a pointer an entry in a next hop forwarding table.

* * * * *